United States Patent [19]
Sakamoto

[11] Patent Number: 5,121,294
[45] Date of Patent: Jun. 9, 1992

[54] IC CARD

[75] Inventor: Jitsuo Sakamoto, Nara, Japan

[73] Assignee: Sharp Kabushiki Kaisha, Osaka, Japan

[21] Appl. No.: 741,360

[22] Filed: Aug. 7, 1991

Related U.S. Application Data

[63] Continuation of Ser. No. 561,232, Jul. 26, 1990, abandoned, which is a continuation of Ser. No. 385,988, Jul. 21, 1989, which is a continuation of Ser. No. 273,189, Nov. 14, 1988, abandoned, which is a continuation of Ser. No. 98,731, Sep. 16, 1987, abandoned, which is a continuation of Ser. No. 898,942, Aug. 21, 1986, abandoned.

[30] Foreign Application Priority Data

Oct. 4, 1985 [JP] Japan ................. 60-152695

[51] Int. Cl.⁵ .............................. H05K 5/00
[52] U.S. Cl. ................. 361/394; 361/401; 361/412; 361/392; 235/492
[58] Field of Search ........... 174/68.5; 235/443, 487, 235/488, 492; 361/111, 394, 395, 401, 412, 414, 424

[56] References Cited

U.S. PATENT DOCUMENTS

| | | | |
|---|---|---|---|
| 3,372,310 | 3/1968 | Kantor | 361/401 |
| 3,702,464 | 11/1972 | Castrucci | 235/492 |
| 4,380,699 | 4/1983 | Monnier et al. | 235/492 |
| 4,532,419 | 7/1985 | Takeda | 235/492 |
| 4,539,472 | 9/1985 | Poetker et al. | 235/492 |
| 4,603,249 | 7/1986 | Hoppe et al. | 235/492 |
| 4,667,088 | 5/1987 | Kramer et al. | 235/492 |

FOREIGN PATENT DOCUMENTS 1093857 12/1960 Fed. Rep. of Germany ...... 361/413

OTHER PUBLICATIONS

Mieboom, "Miniature Contacts for Pluggable Modules", IBM Technical Disclosure Bulletin, vol. 5, No. 5, Oct. 1962, pp. 524-525.

Primary Examiner—Gregory D. Thompson
Attorney, Agent, or Firm—Morrison & Foerster

[57] ABSTRACT

An IC card embedded in molding material has electrical contact pieces located in an indentation to protect the contacts from exposure to static electricity of a person handling that IC card.

3 Claims, 1 Drawing Sheet

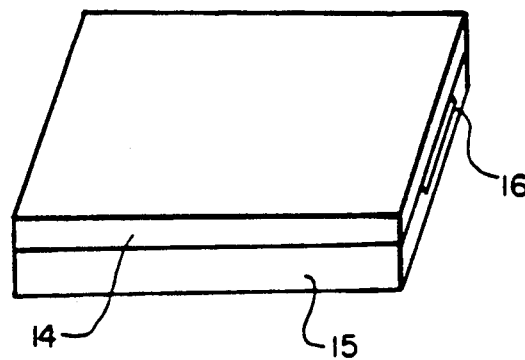
FIG.—1A
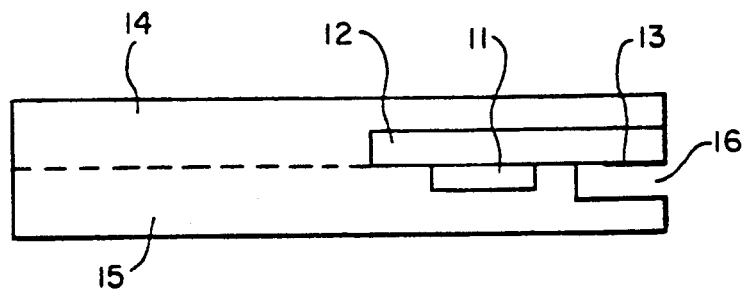
FIG.—1B
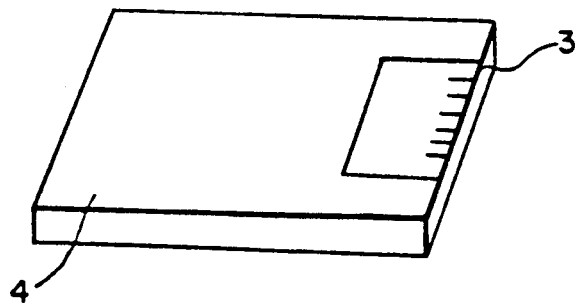
FIG.—2A  PRIOR ART
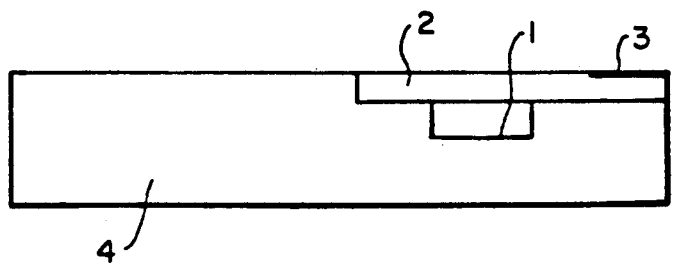
PRIOR ART
FIG.—2B

IC CARD

CROSS REFERENCES

This application is a continuation of earlier filed pending U.S. application Ser. No. 07/561,232, filed Jul. 26, 1990, now abandoned which application is a continuation of earlier filed U.S. application Ser. No. 07/385,988, filed Jul. 21, 1989 (now abandoned), which application is a continuation of earlier filed U.S. application Ser. No. 07/273,189, filed Nov. 14, 1988 (now abandoned), which application is a continuation of earlier filed U.S. application Ser. No. 07/098,731, filed Sep. 16, 1987 (now abandoned), which application is a continuation of earlier filed U.S. application Ser. No. 06/898,942, filed Aug. 21, 1986 (now abandoned), which applications are incorporated herein by reference and to which applications we claim priority under 35 USC §120, and is based on Japanese application 60-152695, filed Oct. 4, 1985, which application is incorporated herein by reference and to which application we claim priority under 35 USC §119.

BACKGROUND OF THE INVENTION

This invention relates to an IC card which contains an IC (integrated circuit) chip and more particularly to such an IC card which can provide better protection to its chip from static electricity.

FIGS. 2A and 2B are illustrations of a conventional IC card. FIG. 2A is a perspective view, FIG. 2B is a sectional side view of a vertical cut, left to right, through about the center of the conventional IC card of FIG. 2A.

As shown in FIGS. 2A and 2B, a conventional IC card is manufactured by mounting an integrated circuit 1 such as a memory or a circuit element on a substrate 2 and using a molding material such as plastic 4 to make a card. Contact pieces 3 through which information is transmitted and received are often formed on the substrate 2 as shown in FIG. 2B such that the integrated circuit 1 and the contact pieces 3 are on opposite surfaces of the substrate 2. In short, the contact pieces 3 of a conventional IC card are either on its front or back surface and are hence externally exposed see also FIG. 2A. This means that the contact pieces of conventional IC card are easily touched by its user. When they are touched by a person, the body's static electricity flows through these contact pieces into the integrated circuit buried inside the card. The circuit can easily be destroyed by such electricity.

SUMMARY OF THE INVENTION

It is therefore an object of the present invention to eliminate such problems related to an IC card.

The above and other objects of the present invention are achieved by providing an IC card with an indentation for accepting a contact means of an external apparatus such as a reader and a writer and providing contact pieces on an inner surface of such an indentation. If an IC card is designed in this fashion, contact between the user's body and the contact pieces can be effectively prevented and hence internally stored circuits will not be destroyed easily by the user's body electricity.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 1A is a perspective view of an IC card embodying the present invention.

FIG. 1B is a sectional view taken along the line 1B—1B of FIG. 1A.

FIG. 2A is a perspective view of a conventional IC card, and

FIG. 2B is a sectional view taken along the line 2B—2B of FIG. 2A.

DETAILED DESCRIPTION OF THE INVENTION

FIGS. 1A and 1B show an IC card embodying the present invention, FIG. 1A being its diagonal external view and FIG. 1B is a sectional side view of a vertical cut, left to right, through about the center of the IC card as indicated by line 1B—1B in FIG. 1A. An integrated circuit 11 such as a memory and other circuit elements (not shown) are mounted by film carrier technology on a substrate 12 of thickness about 0.3 mm. Contact pieces 13 through which information is transmitted and received are on the same surface of the substrate 12 with the circuit 11. This combination is sandwiched between two thin, flat pieces 14 and 15 of a molding material such as plastic into the form of a card with length, width and thickness respectively about 85 mm, 54 mm and 3 mm. For exchanging information with an internal apparatus such as a reader and a writer, the contact piece of such an external apparatus (not shown) is inserted into an indentation or an opening 16 which is provided on a side surface of the IC card as shown to make contacts with these contact pieces 13 of the IC card. The depth, width and beight of the indentation 16 may be about 10 mm, 47 mm and 1 mm, respectively.

With the sandwich-like construction as shown above, the indentation 16 can be made sufficiently narrow such that the contact pieces 13 of the IC card are not easily accessible by the user. Destruction of integrated circuits in IC cards by static electricity of the user's body can thus be prevented substantially. In addition, since the IC chip is sandwiched between nolding pieces 14 and 15 from both sides, the IC card of the present invention has improved mechanical strength. According to the present invention, furthermore, throughholes for making electrical connections between IC terminals on one side of the substrate and contact pieces on the other side can be dispensed with.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, the dimensions of the card and the indentation are not intended to limit the scope of the invention. Such modifications and variations are intended to be included within the scope of this invention.

What is claimed is:

1. An integrated circuit card, comprising:
   a first thin, flat, molded piece having a planar bottom surface and a planar top surface which surface includes an indentation at one edge of the piece;
   an integrated circuit element embedded in the planar top surface of the first thin, flat molded piece;

a second thin, flat, molded piece having a planar top surface and a planar bottom surface which is in contact with the planar top surface of the first thin, flat, molded piece;

a substrate element embedded in the bottom planar surface of the second thin, flat, molded piece at a position such that the substrate element contacts the integrated circuit element; and an electrical contact piece on the bottom planar surface of the second thin, flat, molded piece at a position such that the contact is over the indentation on the first thin, flat, molded piece and positioned such that the contact is not reachable by a finger.

2. The integrated circuit card as claimed in claim 1, wherein the first and second thin, flat molded pieces combine to form an integrated circuit with dimensions of length, width and thickness respectively of about 85 mm, 54 mm and 3 mm.

3. The integrated circuit card as claimed in claim 1, wherein the indentation has dimensions of depth, width and height respectively of about 10 mm, 47 mm and 1 mm respectively.

* * * * *